US010457607B2

(12) United States Patent
Nishioka et al.

(10) Patent No.: US 10,457,607 B2
(45) Date of Patent: Oct. 29, 2019

(54) BINDER RESIN COMPOSITION

(71) Applicant: SUMITOMO SEIKA CHEMICALS CO., LTD., Kako-gun, Hyogo (JP)

(72) Inventors: Kiyoshi Nishioka, Kobe (JP); Masahiro Suzuki, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 282 days.

(21) Appl. No.: 15/557,579

(22) PCT Filed: Mar. 2, 2016

(86) PCT No.: PCT/JP2016/056412
§ 371 (c)(1),
(2) Date: Sep. 12, 2017

(87) PCT Pub. No.: WO2016/158175
PCT Pub. Date: Oct. 6, 2016

(65) Prior Publication Data
US 2018/0057415 A1    Mar. 1, 2018

(30) Foreign Application Priority Data

Mar. 30, 2015  (JP) ................................. 2015-068377

(51) Int. Cl.
| | | |
|---|---|---|
| *C08G 18/10* | (2006.01) | |
| *C04B 35/634* | (2006.01) | |
| *C08K 3/00* | (2018.01) | |
| *C08L 69/00* | (2006.01) | |
| *C08L 31/02* | (2006.01) | |
| *C08G 18/44* | (2006.01) | |
| *C08G 64/02* | (2006.01) | |
| *C08G 18/76* | (2006.01) | |

(52) U.S. Cl.
CPC ........ *C04B 35/63464* (2013.01); *C08G 18/10* (2013.01); *C08G 18/44* (2013.01); *C08G 18/7671* (2013.01); *C08G 64/0208* (2013.01); *C08G 64/0216* (2013.01); *C08K 3/00* (2013.01); *C08L 31/02* (2013.01); *C08L 69/00* (2013.01); *C08K 2201/005* (2013.01)

(58) Field of Classification Search
USPC ................................................ 528/196, 198
See application file for complete search history.

(56) References Cited

U.S. PATENT DOCUMENTS

| | | |
|---|---|---|
| 4,066,630 A | 1/1978 | Dixon et al. |
| 2009/0030129 A1 | 1/2009 | Chakravarti et al. |
| 2012/0165479 A1 | 6/2012 | Hong et al. |
| 2014/0008588 A1 | 1/2014 | Fujimoto et al. |
| 2016/0181098 A1 | 6/2016 | Inoue et al. |
| 2017/0117393 A1 | 4/2017 | Inoue et al. |

FOREIGN PATENT DOCUMENTS

| | | |
|---|---|---|
| JP | 62-246856 A | 10/1987 |
| JP | 6-334282 A | 12/1994 |
| JP | 7-224219 A | 8/1995 |
| JP | 2012-224675 A | 11/2012 |
| JP | 2014-501316 A | 1/2014 |
| JP | 2015-147861 A | 8/2015 |
| WO | WO 2009/015194 A1 | 1/2009 |
| WO | WO 2012/128028 A1 | 9/2012 |
| WO | WO 2015/019771 A1 | 2/2015 |

OTHER PUBLICATIONS

International Search Report dated May 17, 2016, in PCT International Application No. PCT/JP2016/056412.
Peng et al., "Thermal degradation kinetics of uncapped and end-capped poly(propylene carbonate)," Polymer Degradation and Stability (2003), vol. 80, pp. 141-147.
Extended European Search Report dated Aug. 3, 2018, in European Patent Application No. 16772059.8.

*Primary Examiner* — Terressa Boykin
(74) *Attorney, Agent, or Firm* — Birch, Stewart, Kolasch & Birch, LLP (57) ABSTRACT

A binder resin composition comprising an aliphatic polycarbonate resin represented by the formula (1):

$$\text{HO}\underset{R^3\ R^4}{\overset{R^1\ R^2}{\diagdown\diagup}}\left(\text{O}\underset{\text{O}}{\overset{\text{O}}{\diagdown\diagup}}\text{O}\underset{R^3\ R^4}{\overset{R^1\ R^2}{\diagdown\diagup}}\right)_m \text{OH,} \quad (1)$$

and an end-capped aliphatic polycarbonate resin represented by the formula (2):

$$\text{X}\underset{R^7\ R^8}{\overset{R^5\ R^6}{\diagdown\diagup}}\left(\text{O}\underset{\text{O}}{\overset{\text{O}}{\diagdown\diagup}}\text{O}\underset{R^7\ R^8}{\overset{R^5\ R^6}{\diagdown\diagup}}\right)_n \text{Y} \quad (2)$$

wherein each of X and Y, which may be identical or different, is a group having at least one functional group selected from a carboxy group, an ester group, a carbamate group, a silicate group, an isocyanate group, an ether group, an acetal group, and a halogen atom at its end; and an inorganic particle-dispersed paste composition containing the resin composition. The binder resin composition of the present invention can be used in general molded articles, optical materials such as films, fibers, optical fibers, and optical disks, thermally decomposable materials such as ceramic binders, and lost foam casting, medicinal materials such as drug capsules, additives for biodegradable resins, main components for biodegradable resins, and the like.

4 Claims, 2 Drawing Sheets

BINDER RESIN COMPOSITION

TECHNICAL FIELD

The present invention relates to a binder resin composition and a fine inorganic particle-dispersed paste composition containing the resin composition.

BACKGROUND ART

In recent years, various manufactured articles have been produced by producing a slurry containing an inorganic powder of electroconductive particles, ceramics, glass, a phosphor or the like and a binder for molding, molding a slurry mixture, and sintering a molded product. As binders for molding, polyvinyl butyral (PVB), ethyl cellulose (EC), carboxymethyl cellulose (CMC), polyvinyl alcohol (PVA), acrylic polymers, and the like have been used. Although it is preferable that the binder component completely disappears during sintering, the above-mentioned binders are hardly decomposable, so that binder residues remain in the molded ceramics by merely heating alone, which cause worsening effects to the performance of the ceramics. Therefore, a method of supplying oxygen during the sintering and completely combusting a binder to allow the binder to disappear has been employed.

However, when oxygen is present under high-temperature conditions during the sintering, the inorganic components would be undesirably modified, so that the performance of the sintered bodies is lowered in some cases, and in many cases after the sintering, a further step of sintering under reductive atmosphere would be necessitated. Therefore, a binder which can disappear without supplying oxygen during the sintering has been desired.

Further, since the above-mentioned binder exothermically decomposes, it would be difficult to sinter in a large amount at one time while controlling the temperature of the sintering furnace.

As binders capable of endothermically decomposing without requiring oxygen during the sintering, aliphatic polycarbonate resins such as polypropylene carbonate and polyethylene carbonate have been studied. However, in some cases the decomposition temperatures of these resins are too low depending upon the production processes (see, Patent Publication 1). In view of the above, as a solving means thereof, a method of elevating a decomposition temperature by capping a molecular chain end has been known (see, Patent Publication 2, Non-Patent Publication 1).

PRIOR ART REFERENCES

Patent Publications

Patent Publication 1: Japanese Patent Laid-Open No. Hei-6-334282
Patent Publication 2: U.S. Pat. No. 4,066,630

Non-Patent Publications

Non-Patent Publication 1: Shuwen Peng, Yuxian An, Cheng Chen, Bin Fei, Yugang Zhuang, Lisong Dong. *Polymer Degradation and Stability*, 2003, 80, 141-147

SUMMARY OF THE INVENTION

Problems to be Solved by the Invention

However, it would be difficult to design by these means binders so as to decompose at any desired temperatures, and their applications to the process would be undesirably limited. Therefore, a binder capable of highly precisely controlling a decomposition temperature has been desired.

An object of the present invention is to provide a binder resin composition capable of highly precisely controlling a decomposition temperature, and a fine inorganic particle-dispersed paste composition containing the resin composition.

Means to Solve the Problems

As a result of intensive studies in order to solve the above problems, the present inventors have found that mixing of a capped resin in which an end of an aliphatic polycarbonate resin is capped with a capping agent (end-capping agent) and an uncapped resin in any given proportions can nearly optionally control the initial decomposition temperature within the initial decomposition temperature of both the resins, and after further intensive studies, the present invention has been perfected thereby.

The present invention relates to:
[1] a binder resin composition containing an aliphatic polycarbonate resin represented by the formula (1):

wherein each of $R^1$, $R^2$, $R^3$, and $R^4$ which may be identical or different, is a hydrogen atom, an alkyl group having from 1 to 10 carbon atoms, or an aryl group having from 6 to 20 carbon atoms; and m is an integer of from 40 to 23,000, and
an end-capped aliphatic polycarbonate resin represented by the formula (2):

wherein each of $R^5$, $R^6$, $R^7$ and $R^8$, which may be identical or different, is a hydrogen atom, an alkyl group having from 1 to 10 carbon atoms, or an aryl group having from 6 to 20 carbon atoms; each of X and Y, which may be identical or different, is a group having at least one functional group selected from a carboxy group, an ester group, a carbamate group, a silicate group, an isocyanate group, an ether group, an acetal group, and a halogen atom at its end; and n is an integer of from 40 to 23,000; and
[2] a fine inorganic particle-dispersed paste composition containing a binder resin composition as defined in the above [1], fine inorganic particles, and a solvent.

Effects of the Invention

The binder resin composition of the present invention exhibits an excellent effect of being capable of highly precisely controlling a decomposition temperature.

MODES FOR CARRYING OUT THE INVENTION

The binder resin composition of the present invention contains an aliphatic polycarbonate resin represented by the formula (1):

(1)

wherein each of $R^1$, $R^2$, $R^3$, and $R^4$, which may be identical or different, is a hydrogen atom, an alkyl group having from 1 to 10 carbon atoms, or an aryl group having from 6 to 20 carbon atoms; and m is an integer of from 40 to 23,000, and
an end-capped aliphatic polycarbonate resin represented by the formula (2):

(2)

wherein each of $R^5$, $R^6$, $R^7$ and $R^8$, which may be identical or different, is a hydrogen atom, an alkyl group having from 1 to 10 carbon atoms, or an aryl group having from 6 to 20 carbon atoms; each of X and Y, which may be identical or different, is a group having at least one functional group selected from a carboxy group, an ester group, a carbamate group, a silicate group, an isocyanate group, an ether group, an acetal group, and a halogen atom at its end; and n is an integer of from 40 to 23,000.

Usually, when two kinds of resins are mixed and thermally decomposed, each of the resins independently undergoes thermal decomposition; however, the binder resin composition of the present invention decomposes apparently as a single resin depending upon the mixing ratios of each of the resins, so that the decomposition temperature of the binder resin composition can be highly precisely controlled.

In the formulas (1) and (2), the number of carbon atoms of the alkyl group is from 1 to 10, and preferably from 1 to 4. The alkyl group is preferably a linear or branched, substituted or unsubstituted alkyl group, including, for example, a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. The alkyl group may be substituted with, for example, one or more substituents selected from an alkoxy group, an ester group, a silyl group, a sulfanyl group, a cyano group, a nitro group, a sulfo group, a formyl group, an aryl group, a halogen atom, and the like.

In addition, the number of carbon atoms of the aryl group is from 6 to 20, and preferably from 6 to 14. The aryl group includes, for example, a phenyl group, an indenyl group, a naphthyl group, a tetrahydronaphthyl group, and the like. The aryl group may be substituted with, for example, one or more substituents selected from alkyl groups such as a methyl group, an ethyl group, an n-propyl group, an isopropyl group, an n-butyl group, a sec-butyl group, and a tert-butyl group, other aryl groups such as a phenyl group and a naphthyl group, an alkoxy group, an ester group, a silyl group, a sulfanyl group, a cyano group, a nitro group, a sulfo group, a formyl group, a halogen atom, and the like.

In the formulas (1) and (2), each of n and m is an integer of from 40 to 23,000, and preferably from 200 to 5,000. n and m may be identical or different, it is preferable that n and m are closer, and a ratio of n to m (n/m) is preferably from 0.5 to 2.0. and more preferably from 0.7 to 1.3.

In the formula (2), each of X and Y is a group of which end is a group other than a hydroxy group, which is a group having at least one functional group selected from a carboxy group, an ester group, a carbamate group, a silicate group, an isocyanate group, an ether group, an acetal group, and a halogen atom at its end, and a group having at least one functional group selected from a carboxy group, an ester group, a carbamate group, and an isocyanate group at its end is preferred, from the viewpoint of facilitation of capping reaction.

The method for producing an aliphatic polycarbonate resin mentioned above includes a method including subjecting an epoxide and carbon dioxide to a polymerization reaction.

In the above aliphatic polycarbonate resin, the epoxide usable for producing an aliphatic polycarbonate resin represented by the formula (1) or (2) includes, but not particularly limited to, for example, ethylene oxide, propylene oxide, 1,2-butylene oxide, 2,3-butylene oxide, isobutylene oxide, 1-pentene oxide, 2-pentene oxide, 1-hexene oxide, 1-octene oxide, 1-dodecene oxide, cyclopentene oxide, cyclohexene oxide, styrene oxide, vinylcyclohexane oxide, 3-phenylpropylene oxide, 3,3,3-trifluoropropylene oxide, 3-naphthylpropylene oxide, 2-phenoxypropylene oxide, 3-naphthoxypropylene oxide, butadiene monoxide, 3-vinyloxypropylene oxide, 3-trimethylsilyloxypropylene oxide, and the like.

Among the epoxides, ethylene oxide, propylene oxide, and 1,2-butylene oxide are preferred, and ethylene oxide and propylene oxide are more preferred, from the viewpoint of having high reactivities. Therefore, each of the aliphatic polycarbonate resin represented by the formula (1) and the aliphatic polycarbonate resin represented by the formula (2), which may be identical or different, is preferably at least one member selected from the group consisting of polyethylene carbonate, polypropylene carbonate, and polybutylene carbonate, and more preferably polyethylene carbonate and/or polypropylene carbonate.

It is preferable that the polymerization reaction of the epoxide and carbon dioxide is carried out in the presence of a metal catalyst.

The metal catalyst includes, for example, zinc-based catalysts, aluminum-based catalysts, chromium-based catalysts, cobalt-based catalysts, and the like. Among them, zinc-based catalysts and/or cobalt-based catalysts are preferred because of having high polymerization activities in the polymerization reaction of an epoxide and carbon dioxide, and zinc-based catalysts are more preferred from the viewpoint of obtaining high-molecular weight products.

The zinc-based catalyst includes, for example, organozinc catalysts such as zinc acetate, diethylzinc, and dibutylzinc; organozinc catalysts obtainable by reacting a compound such as a primary amine, a dihydric phenol (benzenediol), an aromatic dicarboxylic acid, an aromatic hydroxy acid, an aliphatic dicarboxylic acid, or an aliphatic monocarboxylic acid and a zinc compound; and the like. Among these organozinc catalysts, organozinc catalysts obtainable by reacting a zinc compound, an aliphatic dicarboxylic acid and an aliphatic monocarboxylic acid are preferred, and organozinc catalysts obtainable by reacting zinc oxide, glutaric acid, and acetic acid are more preferred, because of having even higher polymerization activities.

The used amount of the metal catalyst usable in the above polymerization reaction, based on one mol of the epoxide, is preferably 0.001 mol or more, and more preferably 0.005 mol or more, from the viewpoint of accelerating the progress of the polymerization reaction, and the used amount is preferably 0.2 mol or less, and more preferably 0.1 mol or less, from the viewpoint of obtaining the effects that measure up the used amount.

In the above polymerization reaction, a reaction solvent may be optionally used. The reaction solvent is not particularly limited, and various organic solvents can be used. The organic solvent includes aliphatic hydrocarbon-based solvents such as pentane, hexane, octane, decane, and cyclohexane; aromatic hydrocarbon-based solvents such as benzene, toluene, and xylene; halogenated hydrocarbon-based solvents such as methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; ether-based solvents such as dimethoxyethane, tetrahydrofuran, 2-methyltetrahydrofuran, 1,4-dioxane, and 1,3-dioxolane; ester-based solvents such as ethyl acetate, n-propyl acetate, and isopropyl acetate; amide-based solvents such as N,N-dimethylformamide and N,N-dimethylacetamide; carbonate-based solvents such as dimethyl carbonate, ethyl methyl carbonate, diethyl carbonate, and propylene carbonate; and the like.

The used amount of the reaction solvent is preferably from 100 to 10,000 parts by mass, based on 100 parts by mass of the epoxide, from the viewpoint of smoothly progressing the reaction.

The method for carrying out a polymerization reaction of an epoxide and carbon dioxide in the presence of a metal catalyst includes, but not particularly limited to, for example, a method including charging an autoclave with an epoxide, a metal catalyst and optionally a promoter, a reaction solvent or the like, mixing the contents, and thereafter pressurizing with carbon dioxide to react.

The used amount of carbon dioxide usable in the above polymerization reaction is preferably from 0.5 to 10 mol, more preferably from 0.6 to 5 mol, and even more preferably from 0.7 to 3 mol, based on one mol of the epoxide.

The used pressure of carbon dioxide usable in the above polymerization reaction is, but not particularly limited to, preferably 0.1 MPa or more, more preferably 0.2 MPa or more, and even more preferably 0.5 MPa or more, from the viewpoint of smoothly progressing the reaction, and the used pressure is preferably 20 MPa or less, more preferably 10 MPa or less, and even more preferably 5 MPa or less, from the viewpoint of obtaining effects that measure up to the used pressure.

The polymerization reaction temperature in the above polymerization reaction is, but not particularly limited to, preferably 0° C. or higher, more preferably 20° C. or higher, and even more preferably 30° C. or higher, from the viewpoint of shortening the reaction time, and the polymerization reaction temperature is preferably 100° C. or lower, more preferably 80° C. or lower, and even more preferably 60° C. or lower, from the viewpoint of controlling side reactions, thereby increasing in yields.

The polymerization reaction time cannot be unconditionally determined because the polymerization reaction time differs depending upon the polymerization reaction conditions, and it is preferable that the polymerization reaction time is usually from 1 to 40 hours or so.

The method for producing an end-capped aliphatic polycarbonate resin having a structure represented by the formula (2) includes a method including, subsequent to the polymerization reaction, reacting the reaction product with an end-capping agent, upon producing an aliphatic polycarbonate resin represented by the formula (1); a method including reacting an isolated aliphatic polycarbonate resin represented by the formula (1) with an end-capping agent; and the like.

The end-capping agent includes, for example, carboxylic acids such as formic acid, acetic acid, propionic acid, and benzoic acid; acid anhydrides such as acetic anhydride, succinic anhydride, maleic anhydride, phthalic anhydride, and pyromellitic anhydride; acid halides such as acetyl chloride, propionyl chloride, benzoyl chloride, p-toluenesulfonyl chloride, oxalyl chloride, succinyl dichloride, adipoyl dichloride, and terephthaloyl dichloride; isocyanate compounds such as methyl isocyanate, ethyl isocyanate, phenyl isocyanate, benzyl isocyanate, 1,6-hexamethylene diisocyanate, 4,4'-diphenylmethane diisocyanate, and tolylene diisocyanate; organic silicate compounds such as methyl silicate, ethyl silicate, and propyl silicate; alkyl halide compounds such as methyl bromide, methyl iodide, benzyl chloride, and benzyl bromide; hydrogen halides such as hydrogen chloride, hydrogen bromide, and hydrogen iodide; and aldehyde compounds such as formaldehyde, acetaldehyde, and benzaldehyde.

The method of reacting an aliphatic polycarbonate resin and an end-capping agent includes a method of carrying out a reaction in an organic solvent, a method of carrying out a reaction by melt-kneading the mixture, and the like.

The organic solvent usable in the reaction of the aliphatic polycarbonate resin and the end-capping agent is not particularly limited so long as the organic solvent is capable of dissolving an aliphatic polycarbonate resin, but not reactive with an end-capping agent, which includes aromatic hydrocarbon-based solvents such as benzene, toluene, and xylene; halogenated hydrocarbon-based solvents such as dichloromethane (methylene chloride), chloroform, 1,2-dichloroethane, and chlorobenzene; ether-based solvents such as dimethoxyethane, tetrahydrofuran, 2-methyltetrahydrofuran, 1,4-dioxane, and 1,3-dioxolane; ester-based solvents such as ethyl acetate, n-propyl acetate, and isopropyl acetate; ketone-based solvents such as acetone, methyl ethyl ketone, methyl isobutyl ketone; amide-based solvents such as N,N-dimethylformamide and N,N-dimethylacetamide; carbonate-based solvents such as dimethyl carbonate and propylene carbonate; and the like.

In the reaction of the aliphatic polycarbonate resin and the end-capping agent, a catalyst may or may not be used. The catalyst usable in the reaction with an end-capping agent includes amine compounds such as triethylamine, tripropylamine, tributylamine, and 4,4-dimethylaminopyridine; nitrogen-containing heterocyclic compounds such as pyridine and N-methylimidazole; organophosphorus compounds such as trimethyl phosphine, triethyl phosphine, and triphenyl phosphine; organotin compounds such as dibutyltin and stannous octanoate; and the like. The used amount of the catalyst is preferably from 0.01 to 1 mol or so, based on one mol of the end-capping agent.

The apparatus usable for carrying out a reaction of the aliphatic polycarbonate resin and the end-capping agent by melt-kneading includes kneaders such as rollers, extruders, Banbury mixers, Plastomills, and Brabender.

The reaction temperature of the aliphatic polycarbonate resin and the end-capping agent is not particularly limited. In a case where a reaction is carried out in an organic solvent, the reaction can be carried out at a temperature of, for example, from 20 to 120° C. or so. In a case where a reaction is carried out by melt-kneading, the reaction can be carried out at a temperature of, for example, from 80 to 200° C. or so.

The used amount of the end-capping agent, in a case of controlling the amount of end-capping, can be regulated depending upon the amount of the end groups. In a case of complete capping, the used amount of the end-capping agent, based on 100 parts by mass of the aliphatic polycarbonate resin, is preferably 0.3 parts by mass or more, and the used amount is preferably 5 parts by mass or less, from the viewpoint of preventing the lowering the performance as a binder due to the residual excess end-capping agent. From these viewpoints, the used amount of the end-capping agent is preferably from 0.3 to 5 parts by mass, and more preferably from 0.5 to 2 parts by mass, based on 100 parts by mass of the aliphatic polycarbonate resin.

The mass-average molecular weight of the aliphatic polycarbonate resin represented by the above formula (1) or (2) is preferably 5,000 or more, more preferably 10,000 or more, and even more preferably 100,000 or more, from the viewpoint of stably dispersing fine inorganic particles in the aliphatic polycarbonate resin, when used as a fine inorganic particle-dispersed paste composition prepared by mixing the binder resin composition with fine inorganic particles, and the mass-average molecular weight is preferably 2,000,000 or less, more preferably 1,000,000 or less, and even more preferably 500,000 or less, from the viewpoint of avoiding the lowering of handling property due to the lowering of solubility of the binder resin composition in a solvent.

The molecular weight distribution (mass-average molecular weight/number-average molecular weight) of the aliphatic polycarbonate resin represented by the above formula (1) or (2) is preferably from 1.0 to 20.0, more preferably from 1.0 to 15.0, and even more preferably from 1.0 to 10.0, from the viewpoint of easiness in controlling the viscosity of a binder solution.

The method for producing a binder resin composition of the present invention includes a method of mixing an aliphatic polycarbonate resin represented by the formula (1) and an end-capped aliphatic polycarbonate resin represented by the formula (2) respectively in any proportions. The blending proportion of the aliphatic polycarbonate resin represented by the formula (1) and the end-capped aliphatic polycarbonate resin represented by the formula (2) is properly determined depending upon the intended thermal decomposition temperature. From the viewpoint that the changes in the thermal decomposition temperature by mixing the two kinds of the aliphatic polycarbonate resins are definite, the mass ratio of the two resins (the aliphatic polycarbonate resin represented by the formula (1)/the end-capped aliphatic polycarbonate resin represented by the formula (2)) is preferably from 10/90 to 90/10, and more preferably from 20/80 to 80/20.

The method of mixing the two kinds of the aliphatic polycarbonate resins includes a method including dissolving the resins once in a solvent, mixing the solutions, and removing the solvents, and a method including melt-kneading the resins with a roller, extruder, Banbury mixer, a Plastomill, a Brabender, or the like.

The binder resin composition of the present invention may optionally contain an additive such as a thixotropic agent, a surfactant, a plasticizer, or a storage stabilizer.

The thixotropic agent includes fatty acid amides, fine silica particles, organic bentonite, and the like. The surfactant includes polyoxyethylene-based surfactants, fatty acid ester-based surfactants, and the like. The plasticizer includes polyether-polyols, phthalic esters, and the like. The storage stabilizer includes amine compounds, carboxylic acid compounds, phosphorus-containing compounds, sulfur-containing compounds, triazole-based compounds, and the like.

The content of the additive in the binder resin composition of the present invention is preferably 30 parts by mass or less, and more preferably 20 parts by mass or less, based on 100 parts by mass of the binder resin (a total of the aliphatic polycarbonate resin represented by the formula (1) and the end-capped aliphatic polycarbonate resin represented by the formula (2)).

A manufactured article of a desired shape can be produced by mixing a binder resin composition of the present invention, a solvent and an inorganic powder made of ceramics, or the like, and optionally additives, and the like to produce a slurry, molding the slurry, and sintering a molded product.

Therefore, the present invention further provides a fine inorganic particle-dispersed paste composition containing a binder resin composition of the present invention, fine inorganic particles, and a solvent.

The fine inorganic particles are, but not particularly limited to, preferably at least one member selected from the group consisting of electroconductive particles, ceramic powders, glass powders, and fine inorganic phosphor particles.

The electroconductive particles include, for example, metal particles made of copper, iron, nickel, palladium, platinum, gold, silver, aluminum, tungsten, alloys thereof, and the like.

The ceramic powders include, for example, powders of alumina, zirconia, titanium oxide, barium titanate, alumina nitride, silicon nitride, boron nitride, silicon carbide, and the like. In addition, nano-ITO (tin-doped indium oxide) usable in transparent electrode materials, or nano-titanium oxide usable in dye sensitized solar cells, or the like can be suitably used.

The glass powders include, for example, glass powders made of various silicon oxides such as $CaO$—$Al_2O_3$—$SiO_2$ system, $MgO$—$Al_2O_3$—$SiO_2$ system, and $LiO_2$—$Al_2O_3$—$SiO_2$ system, bismuth oxide glass, silicate glass, lead glass, zinc glass, boron glass, and the like.

In addition, as glass powders, a glass powder made of a $PbO$—$B_2O_3$—$SiO_2$ mixture, a $BaO$—$ZnO$—$B_2O_3$—$SiO_2$ mixture, a $ZnO$—$Bi_2O_3$—$B_2O_3$—$SiO_2$ mixture, a $Bi_2O_3$—$B_2O_3$—$BaO$—$CuO$ mixture, a $Bi_2O_3$—$ZnO$—$B_2O_3$—$Al_2O_3$—$SrO$ mixture, a $ZnO$—$Bi_2O_3$—$B_2O_3$ mixture, a $Bi_2O_3$—$SiO_2$ mixture, a $P_2O_5$—$Na_2O$—$CaO$—$BaO$—

Al$_2$O$_3$—B$_2$O$_3$ mixture, P$_2$O$_5$—SnO mixture, a P$_2$O$_5$—SnO—B$_2$O$_3$ mixture, a P$_2$O$_5$—SnO—SiO$_2$ mixture, a CuO—P$_2$O$_5$—RO mixture, an SiO$_2$—B$_2$O$_3$—ZnO—Na$_2$O—Li$_2$O—NaF—V$_2$O$_5$ mixture, a P$_2$O$_5$—ZnO—SnO—R$_2$O—RO mixture, a B$_2$O$_3$—SiO$_2$—ZnO mixture, a B$_2$O$_3$—SiO$_2$—Al$_2$O$_3$—ZrO$_2$ mixture, an SiO$_2$—B$_2$O$_3$—ZnO—R$_2$O—RO mixture, an SiO$_2$—B$_2$O$_3$—Al$_2$O$_3$—RO—R$_2$O mixture, an SrO—ZnO—P$_2$O$_5$ mixture, an SrO—ZnO—P$_2$O$_5$ mixture, a BaO—ZnO—B$_2$O$_3$—SiO$_2$ mixture, or the like can be used. Here, the above R stands for an element selected from the group consisting of Zn, Ba, Ca, Mg, Sr, Sn, Ni, Fe, and Mn.

The fine inorganic phosphor particles include, for example, BaMgAl$_{10}$O$_{17}$:Eu, Zn$_2$SiO$_4$:Mn, (Y, Gd)BO$_3$:Eu, and the like.

The content of the binder resin composition in the fine inorganic particle-dispersed paste composition, based on 100 parts by mass of the above fine inorganic particles, is preferably 0.001 parts by mass or more, more preferably 0.01 parts by mass or more, and even more preferably 0.1 parts by mass or more, from the viewpoint of avoiding the lowering of dispersibility of fine inorganic particles, thereby avoiding the lowering of the properties of the sintered bodies due to localization of the fine inorganic particles during molding, and the content is preferably 20 parts by mass or less, more preferably 15 parts by mass or less, and even more preferably 10 parts by mass or less, from the viewpoint of reducing a decomposed product formed by excessive decomposition of the aliphatic polycarbonate resin when sintering a fine inorganic particle-dispersed paste composition, thereby obtaining a close-packed sintered body.

The solvent includes, but not particularly limited to, for example, toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethylpentanediol monoisobutyrate, ethyl carbitol, butyl carbitol, ethyl carbitol acetate, butyl carbitol acetate, terpineol, terpineol acetate, dihydroterpineol, dihydroterpineol acetate, texanol, isophorone, butyl lactate, dioctyl phthalate, dioctyl adipate, benzyl alcohol, phenylpropylene glycol, cresol, N,N-dimethylformamide, propylene carbonate, and the like. Among them, N-methyl-2-pyrrolidone, terpineol, terpineol acetate, ethyl carbitol acetate, butyl carbitol acetate, texanol, and propylene carbonate are preferred, from the viewpoint of having an appropriately high boiling point and being more likely to uniformly evaporate upon sintering. Here, these organic solvents may be used alone or in a combination of two or more kinds.

The content of the solvent in the fine inorganic particle-dispersed paste composition, based on 100 parts by mass of the fine inorganic particles, is preferably 0.001 parts by mass or more, more preferably 0.01 parts by mass or more, and even more preferably 0.1 parts by mass or more, from the viewpoint of dispersibility of the fine inorganic particles, and the content is preferably 100 parts by mass or less, more preferably 80 parts by mass or less, and even more preferably 50 parts by mass or less, from the viewpoint of adjusting viscosity of the fine inorganic particle-dispersed paste composition.

The fine inorganic particle-dispersed paste composition of the present invention may optionally contain an additive.

The additive includes adhesion accelerators, surfactants, plasticizers, storage stabilizers, defoaming agents, and the like.

The adhesion accelerators include amine-based silane coupling agents, glycidyl-based silane coupling agents, and the like. The surfactants include polyoxyethylene-based surfactants, fatty acid ester-based surfactants, and the like. The plasticizers include polyether-polyols, phthalate esters, and the like. The storage stabilizers include amine compounds, carboxylic acid compounds, phosphorus-containing compounds, sulfur-containing compounds, triazole-based compounds, and the like. The defoaming agents include hydrophobic silicas, polyalkylene derivatives, polyether derivatives, and the like.

The content of the additive in the fine inorganic particle-dispersed paste composition is preferably 50 parts by mass or less, and more preferably 30 parts by mass or less, based on 100 parts by mass of the fine inorganic particles.

The method for preparing a fine inorganic particle-dispersed paste composition includes, but not particularly limited to, a method including mixing an aliphatic polycarbonate resin, a solvent, fine inorganic particles, and optionally an additive, while stirring by using a conventionally known stirring method, and the like.

The above known stirring method includes, for example, a method of kneading with an apparatus such as a ball-mill, a Brabender mill, or a triple roller mill, a method of kneading with a mortar, and the like.

EXAMPLES

The present invention will be described more specifically by Examples, without intending to limit the present invention to these Examples. The physical properties of the aliphatic polycarbonate resin were measured by methods described below.

[Mass-Average Molecular Weight (Mw) and Molecular Weight Distribution (Mw/Mn) of Aliphatic Polycarbonate Resin]

Using gel permeation chromatography (Waters 2695 Separation Module, manufactured by Nihon Waters K.K.), measurements were taken in a 30 mmol/L solution of lithium bromide in N,N-dimethylformamide at 40° C. A mass-average molecular weight (Mw) and a number-average molecular weight (Mn) were calculated on the basis of the standard polystyrenes, and a molecular weight distribution (Mw/Mn) was obtained therefrom.

Production Example 1 of Catalyst [Production of Organozinc Catalyst]

A 1-L four-neck flask equipped with a stirrer, a nitrogen gas inlet tube, a thermometer, a Dean-Stark tube, and a reflux condenser was charged with 77.3 g (0.95 mol) of zinc oxide, 123 g (1 mol) of glutaric acid, 1.14 g (0.02 mol) of acetic acid and 760 g of toluene. Next, the internal of the reaction system was heated to 55° C., while allowing to flow nitrogen at a flow rate of 50 mL/min, and the mixture was stirred at the same temperature for 4 hours to react. Thereafter, the temperature was raised to 110° C., the mixture was additionally stirred at the same temperature for 2 hours and subjected to azeotropic dehydration to remove water, and thereafter the reaction mixture was cooled to room temperature, to give a slurry solution containing an organozinc catalyst.

Production Example 1 of Resin [Production of Succinic Anhydride-Capped Polypropylene Carbonate]

The internal of a system of a 1-L autoclave equipped with a stirrer, a gas inlet tube, and a thermometer was previously replaced with a nitrogen atmosphere, and thereafter the autoclave was charged with 117.3 g of a slurry solution containing an organozinc catalyst obtained in Production Example 1 of Catalyst (containing 135 mmol of the organozinc catalyst), 577.2 g of dimethyl carbonate, and 78.3 g (1.35 mol) of propylene oxide. Next, carbon dioxide was added thereto while stirring, and carbon dioxide was filled until the internal of a reaction system reached 1 MPa. Thereafter, the reaction system was raised to 60° C., and a polymerization reaction was carried out for 8 hours while supplementing carbon dioxide consumed by the reaction. The amount of carbon dioxide consumed was 1.17 mol. After the termination of reaction, the autoclave was cooled and depressured, and 0.7 g of succinic anhydride (0.5 parts by mass based on 100 parts by mass of the resins when assuming all the monomers were reacted) was added thereto, and the mixture was stirred at 40° C. for 1 hour. The reaction solution was filtered, and the filtrate was dried in vacuo, to give 120 g of a polypropylene carbonate resin (A) of which end was capped with a carboxy group by succinic anhydride. The resulting polypropylene carbonate had a mass-average molecular weight (Mw) of 236,000 and a molecular weight distribution (Mw/Mn) of 10.0.

Production Example 2 of Resin [Production of Polypropylene Carbonate of which End was Uncapped]

The same procedures as in Production Example 1 of Resin were carried out except that after the termination of reaction, the autoclave was cooled and depressured, the reaction solution was then filtered without adding succinic anhydride, and the filtrate was dried in vacuo, to give 123 g of a polypropylene carbonate resin (B). The resulting polypropylene carbonate had a mass-average molecular weight of 315,000 and a molecular weight distribution (Mw/Mn) of 9.74.

Production Example 3 of Resin [Production of Isocyanate-Capped Polypropylene Carbonate]

Forty grams of a polypropylene carbonate resin (B) and 0.4 g of 4,4'-diphenylmethane diisocyanate were supplied into a kneader (Labo-plastomill 4C150, manufactured by TOYO SEIKI SEISAKU-SHO), and the contents were melt-kneaded at a kneading temperature of 160° C. and a rotational speed of 40 r/min for 5 minutes, to give a polypropylene carbonate resin (C) of which end was capped with an isocyanate group. The resulting polypropylene carbonate had a mass-average molecular weight of 323,000 and a molecular weight distribution (Mw/Mn) of 8.82.

Production Example 4 of Resin [Production of Succinic Anhydride-Capped Polyethylene Carbonate]

Forty grams of a polyethylene carbonate resin (D) (manufactured by Empower Materials under the trade name of QPAC25, Mw: 198,000, Mw/Mn: 3.48) and 0.3 g of succinic anhydride were supplied into a kneader (Labo-plastomill 4C150, manufactured by TOYO SEIKI SEISAKU-SHO), and the contents were melt-kneaded at a kneading temperature of 100° C. and a rotational speed of 40 r/min for 5 minutes, to give a polyethylene carbonate resin (E) of which end was capped with a carboxy group with succinic anhydride. The resulting polyethylene carbonate had a mass-average molecular weight of 197,000, and a molecular weight distribution (Mw/Mn) of 3.49.

Production Example 5 of Resin [Production of Polybutylene Carbonate of which End was Uncapped]

The internal of a system of a 1-L autoclave equipped with a stirrer, a gas inlet tube, and a thermometer was previously replaced with nitrogen atmosphere, and thereafter the autoclave was charged with 117.3 g of a slurry solution containing an organozinc catalyst obtained in Production Example 1 of Catalyst (containing 135 mmol of the organozinc catalyst), 577.2 g of dimethyl carbonate, and 97.3 g (1.35 mol) of 1,2-butylene oxide. Next, carbon dioxide was added thereto under stirring, and carbon dioxide was filled until the internal of the reaction system reached 1 MPa. Thereafter, the reaction system was raised to 60° C., and a polymerization reaction was carried out for 8 hours, while supplementing carbon dioxide consumed by the reaction. The amount of carbon dioxide consumed was 1.02 mol. After the termination of reaction, the autoclave was cooled and depressured, the reaction mixture was filtered, and the filtrate was dried in vacuo, to give 118 g of a polybutylene carbonate resin (F). The resulting polybutylene carbonate had a mass-average molecular weight of 273,000 and a molecular weight distribution (Mw/Mn) of 12.2.

Production Example 6 of Resin [Production of Acetic Anhydride-Capped Polybutylene Carbonate]

The amount 11.6 g (100 mmol) of a polybutylene carbonate resin (F) obtained in Production Example 5 of Resin was dissolved in 120 g of dichloromethane, and 0.51 g (5.0 mmol) of acetic anhydride, 0.3 g (3.25 mmol) of triethylamine, and 0.2 g (1.63 mmol) of 4,4-dimethylaminopyridine were added thereto. The mixture was stirred at 25° C. for 24 hours. Volatile components were removed, and a residue was poured into 200 mL of methanol to precipitate a white polymer. The precipitated white polymer was dried, to give a polybutylene carbonate resin (G) of which end was capped with an ester group by acetic anhydride. The resulting polybutylene carbonate had a mass-average molecular weight of 290,000, and a molecular weight distribution (Mw/Mn) of 10.4.

Example 1

In a 50 mL glass vial, 0.2 g of a polypropylene carbonate resin (A) obtained in Production Example 1 of Resin and 0.8 g of a polypropylene carbonate resin (B) obtained in Production Example 2 of Resin were weighed, and dissolved in 10 g of acetone to prepare a uniform solution. This solution was dried to give 1.0 g of a binder resin composition. The resulting binder resin composition had an initial thermal decomposition temperature of 215.5° C. and a 50% by mass decomposition temperature was 217.2° C.

Examples 2 to 5

The same procedures as in Example 1 were carried out except that a polypropylene carbonate resin (A) and a polypropylene carbonate resin (B) were used in a ratio as listed in Table 1 to give 1.0 g of a binder resin composition.

Referential Examples 1 and 2

The amount 1.0 g of a polypropylene carbonate resin (A) or a polypropylene carbonate resin (B) was dissolved in 10 g of acetone to prepare a uniform solution. This solution was dried to give 1.0 g of a binder resin composition.

The thermal decomposition temperature (Td) and the 50% by mass decomposition temperature (Td50) of the binder resin compositions obtained in each of Examples and Referential Examples were measured in accordance with the following methods. The results are shown in Table 1.

[Thermal Decomposition Temperature (Td) and 50% by Mass Decomposition Temperature (Td50) of Binder Resin Composition]

Using TG/DTA 7220 manufactured by SII Nano Technology, changes in thermogravity are measured while raising a temperature from room temperature to 500° C. at a heating rate of 10° C./min under nitrogen atmosphere. The initial thermal decomposition temperature (Td) is defined as an intersection of a line drawn parallel to the axis of abscissas passing through the mass before the initiation of heating test and a tangent line drawn so that the slope between the inflection points in the decomposition curve would be at its maximum. A 50% by mass decomposition temperature (Td50) is a value reading off a temperature at which thermogravity of a sample is a half (50%) of the mass before the initiation of the heating test.

Figure 1:
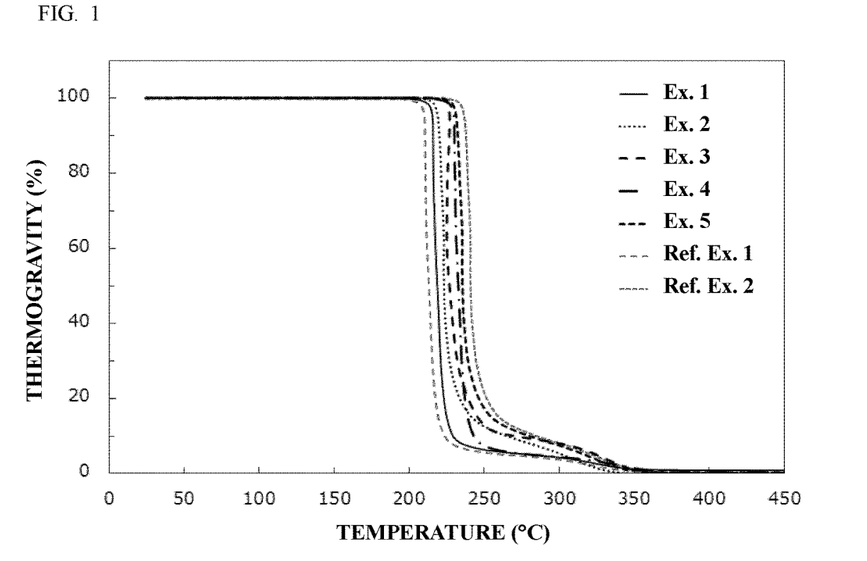
FIG. 1 Thermal decomposition curves of the resin compositions obtained in Examples 1 to 5 and Referential Examples 1 and 2.
Figure 2:
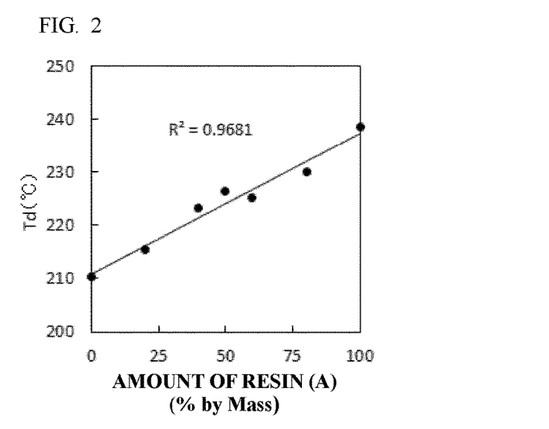
FIG. 2 A graph showing the relationship between the compositional ratio and an initial thermal decomposition temperature of the resin compositions obtained in Examples 1 to 5 and Referential Examples 1 and 2.
Figure 3:
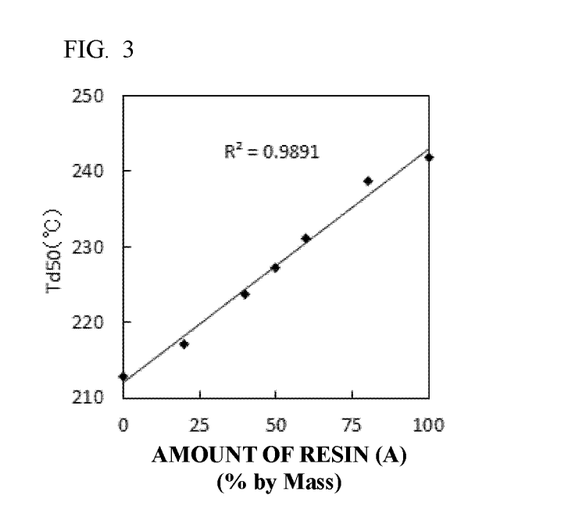
FIG. 3 A graph showing the relationship between the compositional ratio and a 50% by mass decomposition temperature of the resin compositions obtained in Examples 1 to 5 and Referential Examples 1 and 2.

Thermal decomposition curves of the resin compositions obtained in Examples 1 to 5 and Referential Examples 1 and 2 are shown in FIG. 1. In addition, a graph showing the relationship between the compositional ratio of the resin compositions obtained in Examples 1 to 5 and Referential Examples 1 and 2 and the initial thermal decomposition temperature (Td) is shown in FIG. 2, and a graph showing the relationship between the compositional ratio of the resin compositions and the 50% by mass decomposition temperature (Td50) is shown in FIG. 3. Here, a determining coefficient $R^2$ listed in Table 1 is obtained by subtracting a ratio of a residual variance to a total variance from 1, when performing a linear approximation of the graphs of FIGS. 1 and 2 by a least square method, in which the closer to 1, the more congruent with the approximation curve.

TABLE 1

| | End-Capped | | | 50% by |
|---|---|---|---|---|
| | Absent Polypropylene Carbonate Resin (B) (% by Mass) | Present Polypropylene Carbonate Resin (A) (% by Mass) | Initial Decomposition Temperature (Td, ° C.) | Mass Decomposition Temperature (Td50, ° C.) |
| Ref. Ex. 1 | 100 | 0 | 210.4 | 212.9 |
| Ex. 1 | 80 | 20 | 215.5 | 217.2 |
| Ex. 2 | 60 | 40 | 223.2 | 223.7 |
| Ex. 3 | 50 | 50 | 226.3 | 227.3 |
| Ex. 4 | 40 | 60 | 225.1 | 231.1 |
| Ex. 5 | 20 | 80 | 230.1 | 238.7 |
| Ref. Ex. 2 | 0 | 100 | 238.5 | 241.9 |
| Determining Coefficient $R^2$ | | | 0.968 | 0.989 |

Examples 6 to 8

The same procedures as in Example 1 were carried out except that a polypropylene carbonate resin (B) and a polypropylene carbonate resin (C) were used in a ratio as listed in Table 2 to give 1.0 g of a binder resin composition.

Referential Example 3

The amount 1.0 g of a polypropylene carbonate resin (C) was dissolved in 10 g of acetone to prepare a uniform solution. This solution was dried to give 1.0 g of a binder resin composition.

Examples 9 to 11

The same procedures as in Example 1 were carried out except that a polyethylene carbonate resin (D) and a polyethylene carbonate resin (E) were used in a ratio as listed in Table 3 to give 1.0 g of a binder resin composition.

Referential Examples 4 and 5

The amount 1.0 g of a polyethylene carbonate resin (D) or a polyethylene carbonate resin (E) was dissolved in 10 g of acetone to prepare a uniform solution. This solution was dried to give 1.0 g of a binder resin composition.

Examples 12 to 14

The same procedures as in Example 1 were carried out except that a polybutylene carbonate resin (F) and a polybutylene carbonate resin (G) were used in a ratio as listed in Table 4 to give 1.0 g of a binder resin composition.

Referential Examples 6 and 7

The amount 1.0 g of a polybutylene carbonate resin (F) or a polybutylene carbonate resin (G) was dissolved in 10 g of acetone to prepare a uniform solution. This solution was dried to give 1.0 g of a binder resin composition.

The thermal decomposition temperature (Td) and the 50% by mass decomposition temperature (Td50) of the binder resin compositions obtained in each of Examples 6 to 14 and. Referential Examples 3 to 7 were measured in accordance with the above methods, and a determining coefficient $R^2$ was obtained. The results are shown in Tables 2 to 4.

TABLE 2

| | End-Capped | | | |
|---|---|---|---|---|
| | Absent Polypropylene Carbonate Resin (B) (% by Mass) | Present Polypropylene Carbonate Resin (C) (% by Mass) | Initial Decomposition Temperature (Td, ° C.) | 50% by Mass Decomposition Temperature (Td50, ° C.) |
| Ref. Ex. 1 | 100 | 0 | 210.4 | 212.9 |
| Ex. 6 | 75 | 25 | 217.8 | 225.8 |
| Ex. 7 | 50 | 50 | 233.1 | 234.7 |
| Ex. 8 | 25 | 75 | 237.7 | 241.2 |
| Ref. Ex. 3 | 0 | 100 | 247.6 | 252.4 |
| Determining Coefficient $R^2$ | | | 0.978 | 0.989 |

TABLE 3

| | End-Capped | | | |
|---|---|---|---|---|
| | Absent Polyethylene Carbonate Resin (D) (% by Mass) | Present Polyethylene Carbonate Resin (E) (% by Mass) | Initial Decomposition Temperature (Td, ° C.) | 50% by Mass Decomposition Temperature (Td50, ° C.) |
| Ref. Ex. 4 | 100 | 0 | 200.3 | 207.7 |
| Ex. 9 | 75 | 25 | 207.1 | 210.9 |

TABLE 3-continued

| | End-Capped | | | |
|---|---|---|---|---|
| | Absent Polyethylene Carbonate Resin (D) (% by Mass) | Present Polyethylene Carbonate Resin (E) (% by Mass) | Initial Decomposition Temperature (Td, ° C.) | 50% by Mass Decomposition Temperature (Td50, ° C.) |
| Ex. 10 | 50 | 50 | 210.9 | 220.5 |
| Ex. 11 | 25 | 75 | 221.7 | 228.4 |
| Ref. Ex. 5 | 0 | 100 | 228.4 | 230.8 |
| Determining Coefficient $R^2$ | | | 0.981 | 0.964 |

TABLE 4

| | End-Capped | | | |
|---|---|---|---|---|
| | Absent Polybutylene Carbonate Resin (F) (% by Mass) | Present Polybutylene Carbonate Resin (G) (% by Mass) | Initial Decomposition Temperature (Td, ° C.) | 50% by Mass Decomposition Temperature (Td50, ° C.) |
| Ref. Ex. 6 | 100 | 0 | 225.6 | 225.9 |
| Ex. 12 | 75 | 25 | 228.4 | 228.5 |
| Ex. 13 | 50 | 50 | 234.5 | 236.0 |
| Ex. 14 | 25 | 75 | 239.0 | 239.1 |
| Ref. Ex. 7 | 0 | 100 | 240.1 | 241.2 |
| Determining Coefficient $R^2$ | | | 0.961 | 0.954 |

It can be seen from the above results that the binder resin composition of the present invention has a determining coefficient that approximates 1 in the relationship between a mixing ratio of two kinds of resins and a thermal decomposition temperature, and that the determining coefficient can be optionally adjusted within the range of the decomposition temperature of each of the resins before mixing by adjusting the mixing ratio.

Example 15

Production Example of Fine Inorganic Particle-Dispersed Paste

In a 10 mL glass vial 0.12 g of a binder resin composition obtained in Example 1 is weighed, and dissolved in 0.88 g of N-methyl-2-pyrrolidone to prepare a uniform solution. In a mortar 4.0 g of silver particles are weighed, and kneaded for 20 minutes while adding the prepared solution until the silver particles are smoothened to give 5.0 g of a silver particle-dispersed paste.

Example 16

In a 10 mL glass vial 0.12 g of a binder resin composition obtained in Example 1 is weighed, and dissolved in 0.88 g of N-methyl-2-pyrrolidone to prepare a uniform solution. The entire amount of this solution and 4.0 g of alumina particles are mixed, the mixture is kneaded with a planetary centrifugal mixer to form a paste, and thereafter kneaded with a triple roller mill to give 5.0 g of an alumina-dispersed paste.

INDUSTRIAL APPLICABILITY

The binder resin composition of the present invention can be used in general molded articles, optical materials such as films, fibers, optical fibers, and optical disks, thermally decomposable materials such as ceramic binders, and lost foam casting, medicinal materials such as drug capsules, additives for biodegradable resins, main components for biodegradable resins, and the like.

The invention claimed is:

1. A binder resin composition comprising an aliphatic polycarbonate resin represented by the formula (1):

(1)

wherein each of $R^1$, $R^2$, $R^3$, and $R^4$, which may be identical or different, is a hydrogen atom, an alkyl group having from 1 to 10 carbon atoms, or an aryl group having from 6 to 20 carbon atoms; and m is an integer of from 40 to 23,000, and an end-capped aliphatic polycarbonate resin represented by the formula (2):

(2)

wherein each of $R^5$, $R^6$, $R^7$ and $R^8$, which may be identical or different, is a hydrogen atom, an alkyl group having from 1 to 10 carbon atoms, or an aryl group having from 6 to 20 carbon atoms; each of X and Y, which may be identical or different, is a group having at least one functional group selected from a carboxy group, an ester group, a carbamate group, a silicate group, an isocyanate group, an ether group, an acetal group, and a halogen atom at its end; and n is an integer of from 40 to 23,000.

2. The binder resin composition according to claim 1, wherein in the formula (2) each of X and Y is a group having at least one functional group selected from a carboxy group, an ester group, a carbamate group, and an isocyanate group at its end.

3. The binder resin composition according to claim 1 or 2, wherein the aliphatic polycarbonate resin represented by the formula (1) and/or the aliphatic polycarbonate resin represented by the formula (2) is at least one member selected from the group consisting of polyethylene carbonate, polypropylene carbonate, and polybutylene carbonate.

4. A fine inorganic particle-dispersed paste composition comprising a binder resin composition as defined in claim 1, fine inorganic particles, and a solvent.

* * * * *